(12) United States Patent
Green et al.

(10) Patent No.: US 7,372,011 B2
(45) Date of Patent: *May 13, 2008

(54) STROBE LIGHT AND LASER BEAM DETECTION FOR LASER RECEIVER HAVING A COMPARISON OF VARIATION IN ENERGY LEVELS AMONG PHOTODETECTORS

(75) Inventors: Francisco Roberto Green, Clayton, OH (US); Frank Beard Douglas, Tipp City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/507,105

(22) Filed: Aug. 21, 2006

(65) Prior Publication Data

US 2006/0278818 A1 Dec. 14, 2006

Related U.S. Application Data

(63) Continuation of application No. 10/936,617, filed on Sep. 8, 2004, now Pat. No. 7,119,316.

(51) Int. Cl.
*H01J 40/14* (2006.01)
(52) U.S. Cl. .................. 250/214 R; 250/221
(58) Field of Classification Search ............ 250/206.2, 250/206.1, 221, 208.2, 559.29, 559.37, 214 R; 356/4.08, 141.4, 152.1
See application file for complete search history.

(56) References Cited

U.S. PATENT DOCUMENTS

| 4,062,634 | A | 12/1977 | Rando et al. |
| 4,240,208 | A | 12/1980 | Pehrson |
| 4,676,634 | A | 6/1987 | Petersen |
| 5,742,069 | A | 4/1998 | Steenwyk et al. |
| 6,286,607 | B1* | 9/2001 | Ohtomo et al. ............ 172/4.5 |
| 6,643,004 | B2 | 11/2003 | Detweiler et al. |
| 2003/0202172 | A1 | 10/2003 | Douglas |
| 2005/0103974 | A1 | 5/2005 | Hsiao |

* cited by examiner

*Primary Examiner*—Que T Le
(74) *Attorney, Agent, or Firm*—Dinsmore & Shohl LLP

(57) ABSTRACT

A device and method detect a moving, relatively thin beam of laser light, and distinguishing between illumination of photodetectors by the beam, and illumination of the photodetectors by an omnidirectional pulse of light. A plurality of photodetector arrays are arranged in a generally vertical row, with each array having a generally vertical row of photodetector elements. Weighting circuits associated with the arrays provide first and second reference signals for each array related to the elements illuminated in the array. The ratio of sum of the reference signals to the difference between the largest and smallest of the reference signals is determined and interpreted as indicating illumination by a relatively thin beam of laser light when the ratio is less than a predetermined level, and as indicating illumination by an omnidirectional pulse of light when the ration is greater than the predetermined level.

14 Claims, 4 Drawing Sheets

STROBE LIGHT AND LASER BEAM DETECTION FOR LASER RECEIVER HAVING A COMPARISON OF VARIATION IN ENERGY LEVELS AMONG PHOTODETECTORS

CROSS-REFERENCE TO RELATED APPLICATIONS

This application is a continuation of U.S. patent application Ser. No. 10/936,617 filed Sep. 8, 2004 now U.S. Pat. No. 7,119,316.

STATEMENT REGARDING FEDERALLY SPONSORED RESEARCH OR DEVELOPMENT

Not Applicable.

BACKGROUND OF THE INVENTION

The present invention relates to equipment of the type used in surveying and construction and, more particularly, to a detector device for such applications which has an improved photodetector arrangement for detecting the position of reference light. The light may typically be a rotating laser beam that defines a reference plane of light or a stationary reference plane or cone of laser light. The reference plane may be horizontal or inclined, as dictated by the application. Additionally, a transmitter projecting the reference light may also regularly project a strobe light in synchronization with rotation of the beam so that the beam defines a specific azimuth angle.

Laser systems have commonly been employed in surveying and construction in which a laser beam is rotated in either a horizontal or a graded plane. U.S. Pat. No. 4,062,634, issued Dec. 13, 1977, to Rando, illustrates a laser transmitter which provides such a rotating reference beam. The rotating beam defines a plane, and various measurements can be made using the plane as a reference. For example, the elevation of a point remote from the laser transmitter may be measured using a rod on which a laser receiver is mounted. The bottom of the rod rests on the ground at the point where the measurement is to be made, and the operator moves the receiver along the rod to a position where it intercepts the laser beam, as indicated by a display on the receiver. One such laser receiver is shown in U.S. Pat. No. 4,240,208, issued Jun. 30, 1987, to Pehrson.

Additionally, laser systems have provided an indication of the azimuth angle of the laser beam relative to a reference direction (for example, true north) by transmitting a pulse of light, for example a strobe pulse, once during each rotation when the beam is directed in the reference direction. Such a system is shown, for example, in U.S. Pat. No. 6,643,004, issued Nov. 4, 2003, to Detweiler et al. Further, it is common for strobe lights to be used as warning lights at a construction site while machine control and surveying operations are taking place.

A laser receiver operating in such an environment must be able to distinguish between those times when the receiver is illuminated by the laser beam and those times when it is illuminated by a pulse of light from a strobe source. One way to distinguish between the two is to provide separate detector elements for the laser light and the strobe light, with optical filters to screen out all light except for light at the appropriate frequencies. This may not always be completely effective, however, and in addition to the unwanted interference, the optical filters may also attenuate light at the frequencies of interest, making such light harder to detect.

It is seen, therefore, that there is a need for a device and method for utilizing a plurality of photodetector arrays including a large number of photodetectors, and for accurately defining which one or ones of the photodetectors have been illuminated and by which light source the photodetectors have been illuminated by processing a number of output signals that have a continuously varying relationship.

SUMMARY OF THE INVENTION

This need is met by a method according to the present invention for detecting a moving, relatively thin beam of laser light, and distinguishing between illumination of photodetectors by such a moving, relatively thin beam of laser light, and illumination of photodetectors by an omnidirectional pulse of light. This method includes the steps of positioning a plurality of photodetector arrays in a generally vertical row, with each array including a plurality of photodetector elements arranged in a generally vertical array row. The photodetector elements in the arrays are collectively arranged in a generally vertically oriented, extended row. Each of said photodetector elements provides an electrical output when illuminated. For each array, a portion of the electrical output of each photodetector element in the array is provided as a first reference signal related to the spacing of the photodetector element from a first end of the array row, and as a second reference signal related to the spacing of the photodetector element from the second end of the array row. The sum of the first and second reference signals from said photodetector arrays is determined, as is the difference between the largest and smallest of the first and second reference signals from said photodetector arrays. The sum of the first and second reference signals from said photodetector arrays is divided by the difference between the largest and smallest of the first and second reference signals from said photodetector arrays and the smallest of the first and second reference signals from said photodetector arrays. The resulting quotient is then interpreted as indicating illumination of the photodetectors by a moving, relatively thin beam of laser light when the quotient is less than a predetermined level, and interpreting the quotient as indicating illumination of said photodetectors by an omnidirectional pulse of light when said quotient is greater than this predetermined level. In the event that the quotient indicates illumination of said photodetectors by the moving, relatively thin beam of laser light, the position of the beam of laser light is determined with respect to the extended row based on the levels of the first and second reference signals from each of the arrays.

A device for detecting a moving, relatively thin beam of laser light, and distinguishing between illumination of photodetectors by such a moving, relatively thin beam of laser light, and illumination of photodetectors by an omnidirectional pulse of light, includes a plurality of photodetector arrays arranged in a generally vertical row. Each array includes a plurality of photodetector elements arranged in a generally vertical array row, such that the photodetector elements in the arrays are arranged in a generally vertically oriented, extended row. Each of the photodetector elements provides an electrical output when illuminated. A plurality of weighting circuits are provided, each weighting circuit associated with a respective one of the plurality of photodetector arrays. Each weighting circuit provides a portion of the electrical output of each photodetector element in the associated array as a first reference signal related to the spacing of the photodetector element from a first end of the array row, and provides a portion of the electrical output of each photodetector element in the associated array as a second reference signal related to the spacing of the photodetector element from the second end of the array row. The weighting circuit associated with each array row is connected to the weighting circuits associated with adjacent array rows. Circuitry is associated with and responsive to the reference signals from connected weighting circuits for determining the ratio of sum of the reference signals to the difference between the largest and smallest of the reference signals, and interpreting this ratio as indicating illumination of the photodetectors by a moving, relatively thin beam of laser light when the ratio is less than a predetermined level, and interpreting the ratio as indicating illumination of the photodetectors by an omnidirectional pulse of light when the quotient is greater than the predetermined level.

Accordingly, it is an object of the present invention to provide a device and method for detecting the relative position of reference light; to provide such a device and method in which a plurality of photodetector arrays are positioned such that the photodetector elements in all of the arrays are arranged in an extended row; and to provide such a device and method in which a plurality of weighting circuits are responsive to the arrays and a plurality of output circuits are responsive to the weighting circuits for determining the position of the reference light, and for determining whether the device is illuminated by a laser beam or by a strobe light pulse.

Other objects and advantages of the invention will be apparent from the following description, the accompanying drawings and the appended claims.

DETAILED DESCRIPTION OF THE PREFERRED EMBODIMENT

Figure 1:
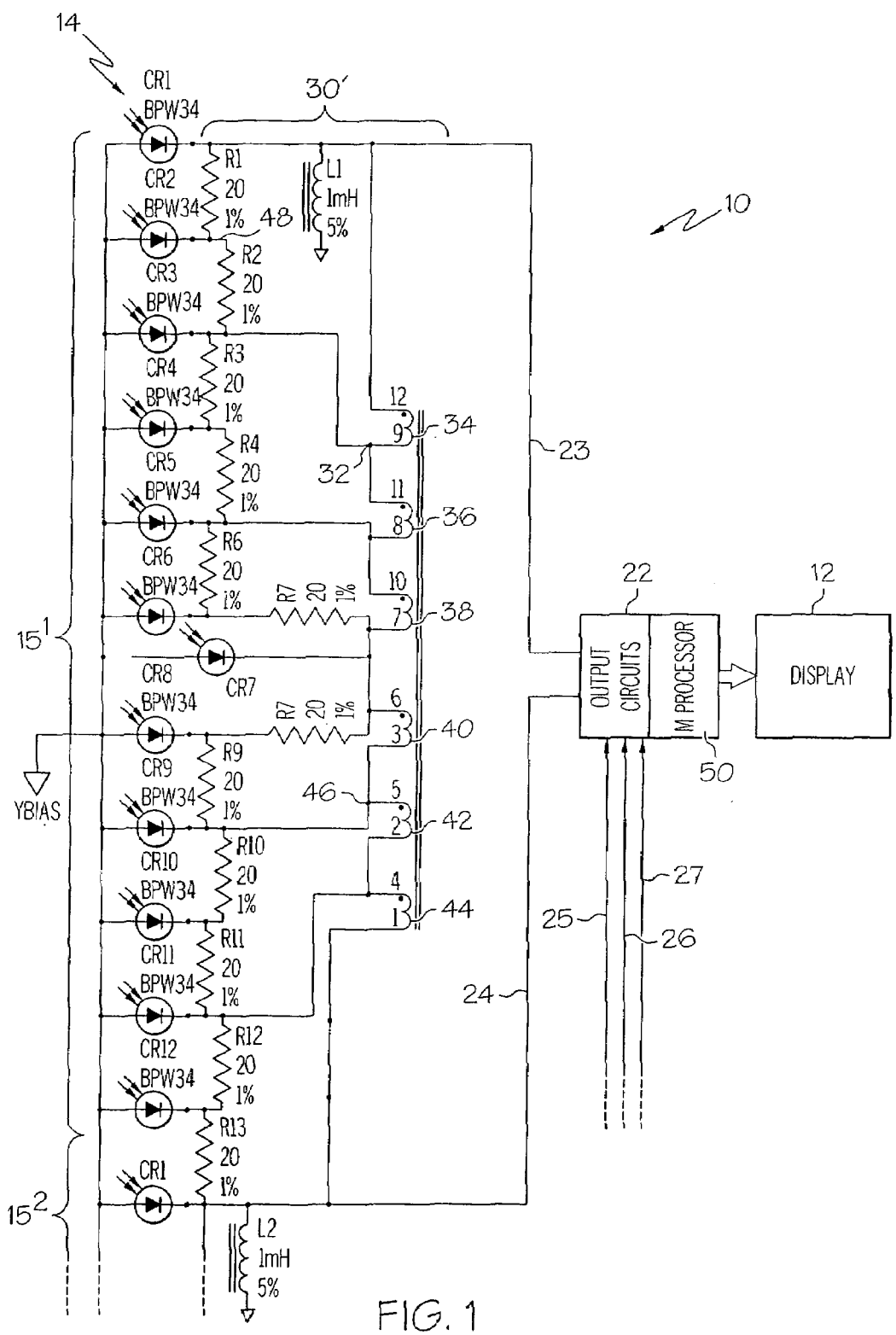
FIG. 1 is a schematic diagram of a portion of the circuitry which forms the device of the present invention.

Reference is made to FIG. 1, which generally illustrates a portion of a detection device 10 according to the present invention. The device detects reference light, such as laser light, and provides an indication of the location of the reference light with respect to the device. The device may also detect reference strobe pulses, as well. Reference light may, for example, be produced by laser transmitters as shown in U.S. Pat. No. 4,062,634, issued Dec. 13, 1977, to Rando et al, or in U.S. Pat. No. 4,732,471, issued Mar. 22, 1988, to Cain et al. Other light transmitters may also be used.

Figure 2:
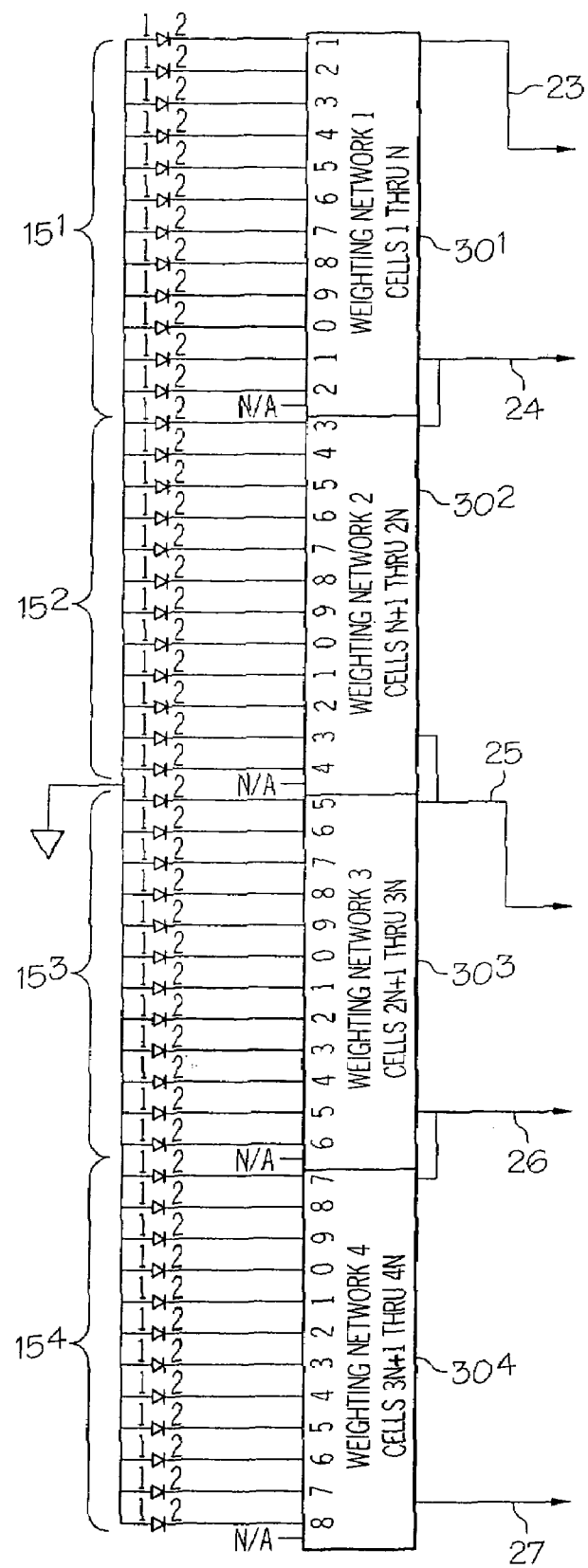
FIG. 2 is a schematic diagram of a portion of the photodetector arrays and weighting circuits of the device of FIG. 1, showing four arrays of photodetectors connected to four concatenated weighting circuits.

The detector device 10 includes a display 12, and a photodetector arrangement 14 including a plurality of photodetector arrays $15^1$, $15^2$, $15^3$, and $15^4$, shown in FIG. 2, arranged in a generally vertical row. Although for purposes of FIGS. 1 and 2 four photodetector arrays are shown, a greater or lesser number may be positioned in an extended row to permit light detection over a larger or lesser dimensional range. Each array includes a plurality of photodetector elements, CR1 through CR12, arranged in a generally vertical array row. The photodetector elements in these arrays $15^1$, $15^2$, $15^3$, and $15^4$, are collectively arranged in a generally vertically oriented, extended row. It will be appreciated that the terms "vertical" and "horizontal" are used here in only a relative sense, and are not intended to refer to any particular absolute orientation. The detector device may be operated with its extended row of photodetector elements in any orientation; it is preferable, however, that the row of photodetector elements be generally perpendicular to the reference plane of laser light which is to be detected. Each of the photodetector elements CR1-CR12 comprises a PIN diode that provides an electrical output when illuminated with the reference light. When the photodetector arrangement 14 is illuminated, output circuits 22 provide an indication on display 12 of the position of the reference plane of light with respect to the detector device 10. As an example, the display 12 may indicate whether the light is above, below, or within a reference band. Alternatively, the display 12 may provide more precise information regarding the position of the reference light, such as a numerical indication of position, or a multi-level display. Other display arrangements may be used or, alternatively, the device may be provided with no display, and with the output from the output circuits 22 being utilized by a machine control circuit to control machine position automatically.

The output circuits 22 are responsive to the relative levels of the first and second reference signals on lines 23 and 24, respectively, provided by the photodetector arrangement 14 for determining the position of the reference light. The output circuits 22 are also responsive to levels of reference signals on lines 25 and 26 from photodetectors in the other arrays.

The device further includes four weighting circuits $30^1$, $30^2$, $30^3$, and $30^4$, shown in FIG. 2. As discussed more fully below, weighting circuits $30^1$, $30^2$, $30^3$, and $30^4$ are associated with photodetector arrays $15^1$, $15^2$, $15^3$, and $15^4$, respectively. It will be appreciated that fewer photodetector arrays may be utilized if desired. The weighting circuit $30^1$ includes resistors R1-R4 and R6-R13, inductors L1 and L2 (shunting D.C. sunlight current), and tapped transformer T1. Each of the plurality of photodetector elements CR1-CR12 is connected to the transformer T1, either directly or through one or more of the resistors. The weighting circuit $30^1$ provides a portion of the electrical output of each photodetector element, when illuminated, as a component of a first reference signal on line 23, related to the spacing of the illuminated photodetector element from the upper end of the row of photodetectors in the array $15^1$. The weighting circuit $30^1$ also provides a portion of the electrical output of each photodetector element, when illuminated, as a component of a second reference signal on line 24, related to the spacing of the illuminated photodetector element from the lower end of the row of photodetectors in array $15^1$. The weighting circuit $30^1$ is configured such that the first reference signal on line 23 increases as the light moves toward the upper end of the row of PIN diodes, and the second reference signal on line 24 increases as the light moves toward the lower end of the row. Conversely, the first reference signal on line 23 decreases as the light moves toward the lower end of the row of PIN diodes CR1-CR12 in array $15^1$, and the second reference signal on line 24 decreases as the light moves toward the upper end of the row. When the light is in the middle of the row, the levels of the two reference signals on lines 23 and 24 are equal. The output circuits 22 respond to the levels of the first and second reference signals on lines 23 and 24 to determine the position of the reference light. As discussed below, the output circuits 22 respond to the reference signals on lines 25 and 26 to determine the position of the reference light when photodetectors in other arrays are illuminated.

Each of the weighting circuits $30^1$, $30^2$, $30^3$, and $30^4$ is associated with a respective one of the plurality of photodetector arrays $15^1$, $15^2$, $15^3$, and $15^4$ and provides a portion of the electrical output of each illuminated photodetector element in its associated array as a first reference signal related to the spacing of the illuminated photodetector element from a first end of the array row, and provides a portion of the electrical output of each illuminated photodetector element in its associated array as a second reference signal related to the spacing of the illuminated photodetector element from the second end of the array row. The weighting circuit associated with each array row is connected to the weighting circuits associated with adjacent array rows.

The weighting circuit $30^1$ provides reference current level signals on lines 23 and 24 in the following manner. Assume that only PIN diode CR3 is illuminated. The output current from diode CR3 will be supplied to node 32 of transformer T1. Approximately ⅚ of the current will pass through coil 34 to line 23, while ⅙ of the current will pass through coils 36, 38, 40, 42, and 44 to line 24. In similar fashion, assume that the reference light has moved such that only PIN diode CR9 is illuminated. The output current from PIN diode CR9 will be supplied to node 46 of transformer T1. Approximately {fraction (⅘)} of the current from diode CR9 will pass through coils 42 and 44 to line 24, while {fraction (⅖)} of the current will pass through coils 34, 36, 38, and 40 to line 23. Thus the way in which the diode current is split and supplied to lines 23 and 24 gives an indication of which of the diodes are illuminated and, therefore, the position of the reference light.

It will be noted that a number of the photodetector elements are not connected directly to a tap of the transformer T1. For example, diode CR2 has its output supplied to node 48. The current at node 48 is then split, with half passing through resistor R1 to line 23, and the other half passing through resistor R2 to node 32. At node 32, ⅚ of this half of the current passes through coil 34 to line 23, and the remaining ⅙ of this half of the passes through coils 36, 38, 40, 42, and 44 to line 24. This results in approximately {fraction (11/12)} of the current being supplied to line 23.

It will be appreciated that the reference light may commonly illuminate more than one of the PIN diodes CR1-CR12 of array $15^1$ at a time. This may occur because the size of the reference beam of laser light is significantly greater than the size of the photodetector elements. Further, thermal gradients in the air through which the laser light passes may result in rapid positional fluctuation of the beam, effectively illuminating a number of photodetector elements at once as the beam flutters between the elements. The weighting circuit $30^1$ splits the current from each of the multiple photodetector elements in dependence upon the position of the photodetector element in array row. As a consequence, the resulting signal levels on lines 23 and 24 are the sums of the various illuminated photodetector elements, and these signal levels accurately reflect the average position of the middle of the beam.

The photodetector elements CR1-CR12 in array $15^1$ are evenly spaced along a generally vertically oriented row. It is desired that the elements CR1-CR12 be spaced apart by distances that are small as compared to the dimension of the beam of reference light that is to be detected. As a consequence, as the light moves vertically with respect to the row of elements it will move onto one photodetector element as it moves off of the adjacent photodetector element. If the spaces between adjacent elements were too large, the levels of the signals on lines 23 and 24 might fluctuate undesirably, even though their relative amplitudes continued to reflect accurately the position of the light.

The output circuits 22 are associated with, and responsive to, reference signals on lines 23, 24, 25, and 26 from connected weighting circuits The output circuits 22 assess the relative levels of the reference signals from the weighting circuits $30^1$, $30^2$, $30^3$, and $30^4$ such that the position of the reference light may be determined with respect to the detector device. Each output circuit preferably includes a separate filter circuit, current-to-voltage amplifier circuit, and peak detection and hold circuit for processing the reference signals on lines 23, 24, 25, and 26. Preferably, the reference signals are converted to digital form. The relative levels of the processed reference signals are assessed by output circuits 22, including microprocessor 50, to determine the position of the reference plane of light with respect to the row of PIN diodes in arrays $15^1$, $15^2$, $15^3$, and $15^4$.

This can be accomplished in a variety of ways. For instance, if the relative levels of the first and second reference signals on lines 23 and 24 change linearly as the light moves up and down the row of photodetectors in array $15^1$, the reference light will be spaced along the row by a fraction of the row length that is equal to the fraction of one of the reference signals divided by the sum of the reference signals one lines 23 and 24. By this technique, it will be appreciated that the absolute intensity of the light striking the photodetector elements is immaterial. Rather, it is the relative levels of the two reference signals from the circuit $30^1$ that define the position of the reference light. Alternatively, the ratio of the first and second reference signals may be taken and used as the address for a table look up algorithm. It will be appreciated that the position of the reference light may be categorized in broad or narrow bands, or specified with any level of precision desired.

Since the device of FIGS. 1 and 2 includes four photodetector arrays, the position of the light with respect to the extended row defined by the arrays may be determined as follows. Array $15^1$ connects to weighting circuit $30^1$ and lines 23 and 24 on which reference signals A1 and A2 are provided, respectively. Array $15^2$ connects to weighting circuit $30^2$ and lines 24 and 25 on which reference signals A2 and A3 are provided, respectively. Array $15^3$ connects to weighting circuit $30^3$ and lines 25 and 26 on which reference signals A3 and A4 are provided, respectively. Finally, array $15^4$ connects to weighting circuit $30^4$ and lines 26 and line 27 on which reference signals A4 and A5 are provided.

The position of the reference light can be determined by the formula $(A1-A2)/(A1+A2)$ if it is on the first array $15^1$, $(A2-A3)/(A2+A3)$ if it is on the second array $15^2$, $(A3-A4)/(A3+A4)$ if it is on the third array 15, and so on. It is, of course, possible for the reference light to illuminate photodetectors in two adjacent arrays simultaneously, falling across the boundary of two adjoining photodetector arrays. This results in signals being produced by both arrays. The formulae for the individual arrays can be combined into one formula which deals with simultaneous illumination of multiple arrays. For two concatenated arrays, the combined formula is $(2\times A1-2\times A3)/(A1+A2+A3)$. For three concatenated arrays, the combined formula is $(3\times A1+A2-A3-3\times A4)/(A1+A2+A3+A4)$. For four concatenated arrays, the combined formula is $(4\times A1+2\times A2-2\times A4-4\times A5)/(A1+A2+$ A3+A4+A5). The formula may be chosen for any desired number of arrays. The microprocessor 50 performs these simple calculations in a straightforward fashion.

Figure 3:
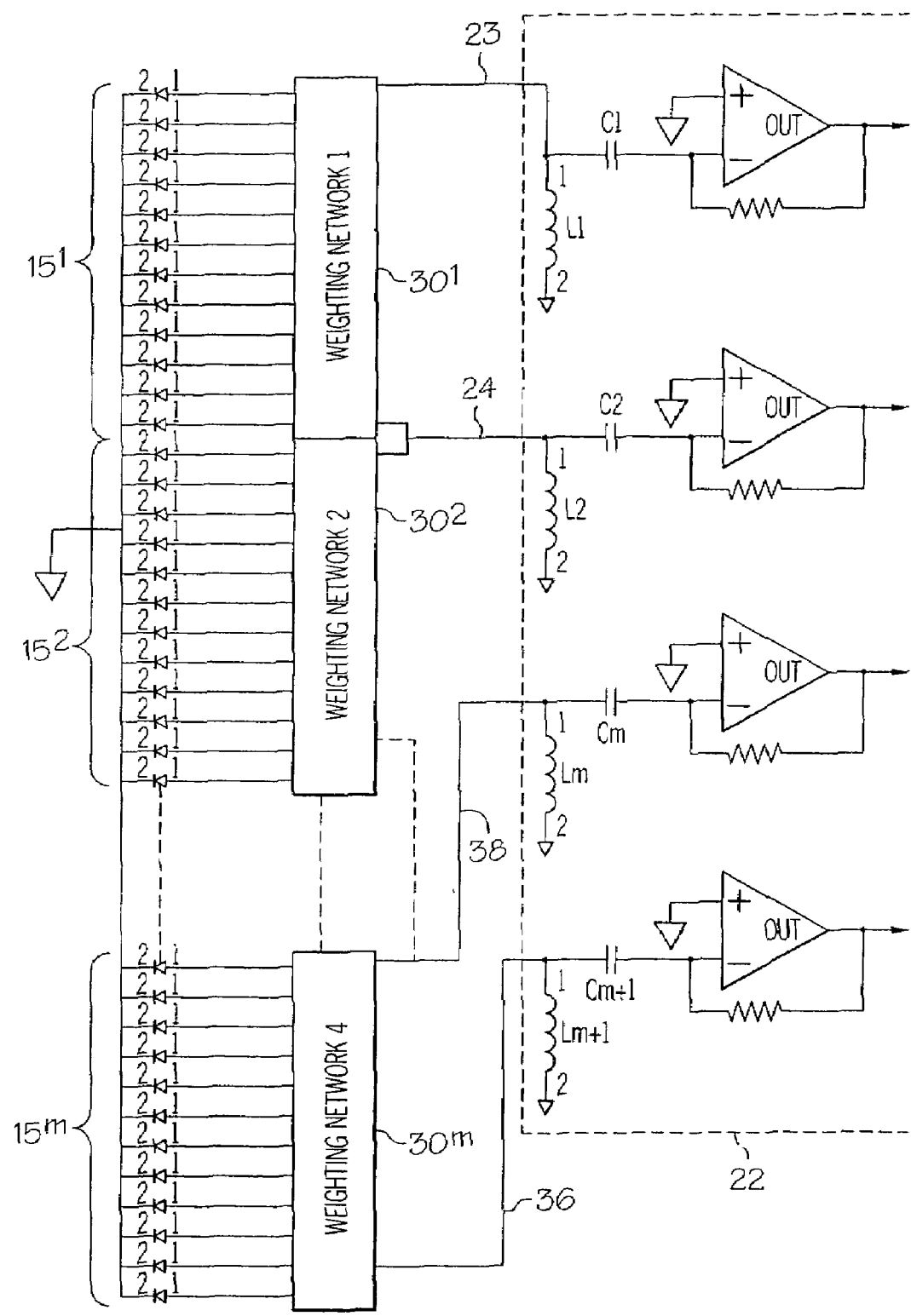
FIG. 3 is a schematic diagram of a portion of the circuitry which forms the device of the present invention, showing m arrays connected to m concatenated weighting circuits.

FIG. 3 is a schematic diagram, illustrating the generalization of the device of the present invention to include m weighting circuits $30^1$, $30^2$, ... $30^m$, which respond to m corresponding photodetector arrays $15^1$, $15^2$, ... $15^m$. As will be appreciated, most photodetectors, such as PIN diodes and phototransistors, are relatively small, and are therefore spaced on about 0.10 to 0.30 inch centers. Close spacing of the photodetectors permits detection of a relatively narrow beam of laser light, for example. Consequently the number of photodetectors required to build a receiver from about 6 inches up to 6 feet in length ranges from about 25 to over 250. This would be increased, of course, depending upon the number of rows of receivers that are used to receive light from different sides of the device. A practical device may typically include an extended row of photodetectors that is 18 inches high and includes seven or eight arrays and seven or eight associated weighting circuits. Connecting photodetector arrays and weighting circuits in concatenated fashion produces a relatively small number of reference signals that nevertheless define the position of the detected reference light quite precisely. As will be noted, the connections of the PIN diodes of FIG. 3 are opposite to those of the PIN diodes of FIG. 2, illustrating that either connection arrangement may be utilized in conjunction with appropriate circuitry.

The device described above detects the relative position of a reference plane of laser light. Initially a plurality of photodetector arrays are arranged in a generally vertical row. Each array includes a plurality of photodetector elements also arranged in a generally vertical array row. As a result, the photodetector elements are arranged in a generally vertically oriented, extended row. Each of the photodetector elements provides an electrical output when illuminated with the reference plane of light. A portion of the electrical output of each photodetector element in each array is provided as a first reference signal related to the spacing of the photodetector element from a first end of the array row. A portion of the electrical output of each photodetector element in the array is provided as a second reference signal related to the spacing of the photodetector element from the second end of the array row. The position of the reference plane of laser light with respect to the extended row is determined based on the levels of the first and second reference signals from each of the arrays.

Portions of the electrical outputs may be separated using a tapped transformer, with each of the plurality of photodetector elements being connected to the transformer. A plurality of tapped transformers are provided. Each of the plurality of transformers is connected to an associated photodetector array. The transformers are connected in series in the same order as the arrangement of the arrays with which they are associated in said extended row. The portions of the electrical outputs are separated using a tapped transformer, with each of the plurality of photodetector elements being connected to the transformer. For each photodetector array, the photodetector elements are connected to the transformer using one or more resistors.

A number of changes and variations may be made to the device of the present invention. For example, the output circuits 22 may be reduced in number by supplying more than one weighting circuit output to the same amplifier circuit. The lower of the two outputs 36 from weighting circuit $30^m$ may be supplied in parallel with the output on line 23 from weighting circuit $30^1$. In such an arrangement, the microprocessor will have no difficulty in distinguishing between the situation in which array $15^1$ is illuminated and the situation in which array $15^m$ is illuminated, since in the former a signal will be received on line 23, and in the latter a signal will be received on line 38.

Other variations in the construction and implementation of the device of the present invention may be made, as well. The number of arrays concatenated together can be more or fewer than the implementation shown, to make a longer or shorter receiver. The number of photodetectors in each array may be more or fewer than the implementation shown. This may be accomplished by using different components to make up the weighting networks, such as transformers with a different number of taps, or using a different arrangement of resistors between the transformer taps.

If desired, the weighting function may be implement by means other than a transformer. For example, a resistor network may be used. Such an arrangement may require applying a reverse bias voltage to the photodetectors in the arrays, depending on their parameters and the intensity of the incident light and the ambient light.

As will be appreciated, laser detectors are subject to various errors, including incorrectly identifying an illumination of the detectors by an extraneous light source as a laser strike. This problem is further complicated by transmitters that also produce a periodic pulse of strobe light, typically one pulse of strobe light during each rotation of the laser beam. Thus, while time windowing (recognizing only beam strikes that occur during regularly occurring time windows) can be used to exclude from consideration much extraneous, random illumination, it cannot be used to block out light from strobes where the strobes are pulsed at the same frequency as the rotational frequency of the laser beam.

The present invention is, however, capable of making this distinction. Basically the present invention recognizes that a great many of the photodetector elements are likely to be illuminated simultaneously by a pulse of strobe light, while a much smaller number of the photodetector elements will be illuminated simultaneously a relatively narrow beam of laser light.

For example, if there were three detector arrays $15^1$ through $15^m$ in FIG. 3 which were illuminated by a pulse of strobe light, the pulse outputs on lines 23, 24, 36 and 38 from weighting circuits $30^1$, $30^2$, ... $30^m$ would all be expected to be substantially equal. If, on the other hand, a relatively narrow beam of laser light were to sweep across the detector arrays $15^1$ through $15^m$, it would be expected that at least one of the pulse outputs on lines 23, 24, 36 and 38 would be relatively low, even if the illumination by the beam occurred over an area bridging two adjacent arrays.

Consider the case where the maximum weighting circuit outputs over a brief period of time are equal to sA, sB, sC, and sD, and the minimum weighting circuit outputs, generally associated with background light levels, are equal to bA, bB, bC, and bD. The processor 50 takes the difference between maximum and minimum outputs in each case to determine four reference signals, A, B, C, and D, associated with the arrays 15 and weighting circuits 30. The processor then assesses the value of signals A, B, C, and D to determine if at least one of these reference signals is below a predetermined threshold. If all of the signals are above the threshold then the processor categorizes the illumination as an omnidirectional pulse of light. If, however, at least one of the signals A, B, C, and D, has a value less than the predetermined threshold, then a second test is applied. The processor 50 determines the difference between the largest and smallest of the reference signals, as well as the sum of all of the reference signals. The processor then determines the ratio of the sum of the reference signals to the difference between the largest and smallest of the reference signals. This ratio is interpreted as indicating illumination of the photodetectors by a moving, relatively thin beam of laser light when the ratio is less than a predetermined level. This ratio is also interpreted as indicating illumination of the photodetectors by an omnidirectional pulse of light when said quotient is greater than the predetermined level. It has been found that for four reference signals, a predetermined level which works well is 2.5. When the ratio is less than 2.5, a laser beam strike is detected, and when the ratio is above 2.5 a strobe pulse is detected.

Additional filtering may be useful. For example, time windowing may be used to detect laser beam illumination coming from a second transmitter. Further, spike filtering of the background readings may advantageously be used to extraneous light noise from the system. It will also be appreciated that the reciprocal of the ratio of the ratio of the sum of the reference signals to the difference between the largest and smallest of the reference signals may be computed and the categorization made based on this reciprocal ratio.

Figure 4:
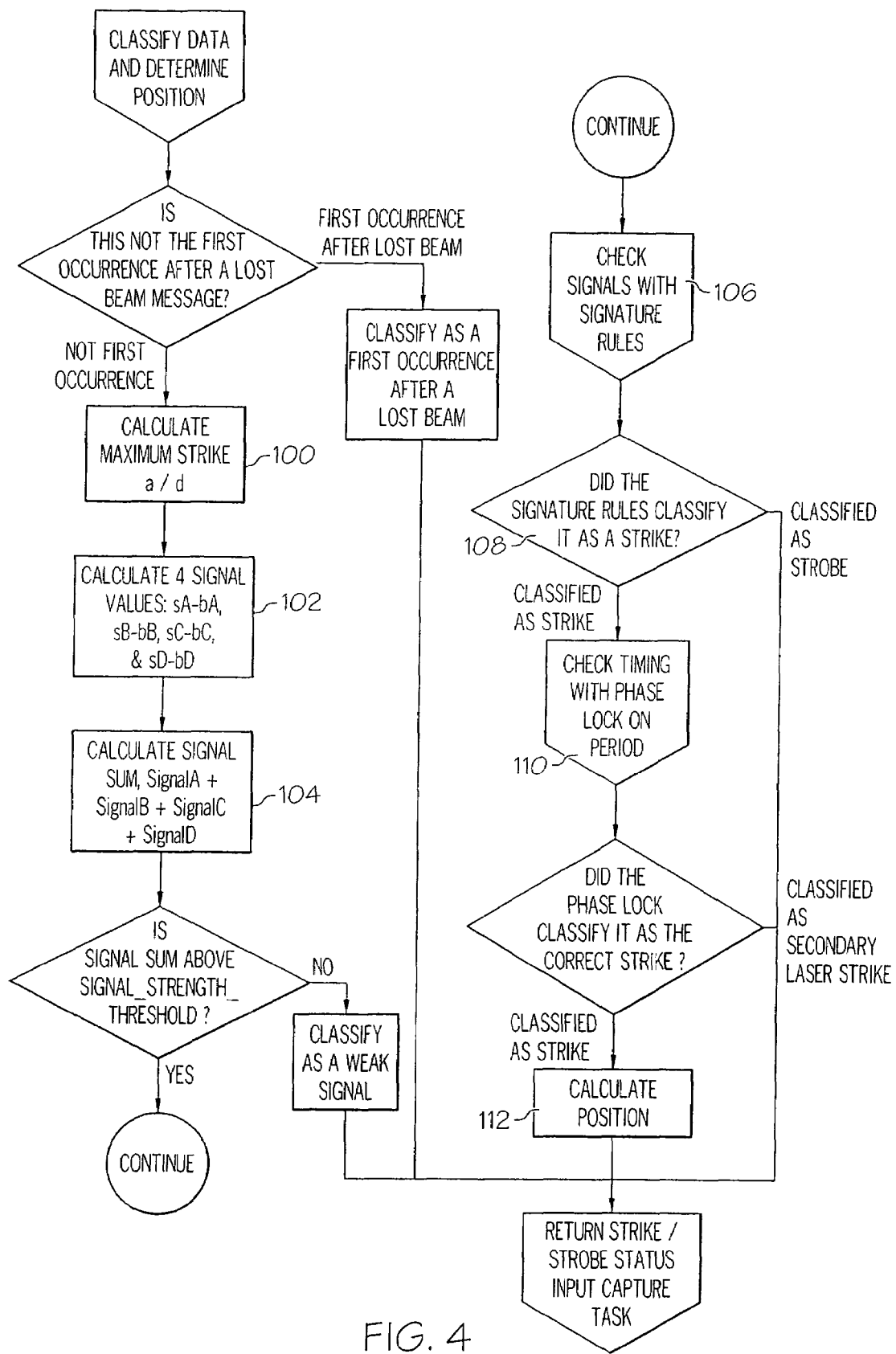
FIG. 4 is a flow chart illustrating the process by which the system of the present invention distinguishes between illumination by a pulse of strobe light and illumination by a relatively narrow beam of laser light.

This method is illustrated in greater detail by the flow chart of FIG. 4. When a beam has not been acquired and a series of detections are received, the maximum strike is detected at 100. The four reference signal values are calculated at 102, as well as the sum of the four reference signal values at 104. Next, the signal strength is detected and, if less than a threshold, the signal is classified as a weak signal the input capture task is re-initiated. If, however, a sufficiently strong signal is detected then the reference signals are checked with signature rules at 106, including for example a determination as to whether the ratio of the sum of the reference signals to the difference between the largest and smallest of the reference signals is less than a predetermined level, such as 2.5. If this is the case, then the illumination is classified as a laser beam strike at 108. If the ratio is greater than 2.5, however, the incident is classified as the receipt of a pulse of light from an omnidirectional source, such as a strobe. If desired, an indication can be given that strobe interference is detected. When the beam strike is detected, the timing of the beam strike is checked with a phase lock circuit at 110. If the beam strike is detected outside the expected time frame, then the beam strike is classified as a illumination from a second laser source. If the beam strike is detected as occurring within the expected time window, however, it is determined to be a valid beam strike, which may be used for position calculation at 112.

It should be appreciated that the present invention is appropriately used with any number of arrays, and can be generalized for use with other types of light detection devices. The invention may be used with any detector having multiple arrays, where each array provides two signals that provide an indication of the detectors in the array that are illuminated.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method for detecting a moving, relatively thin beam of laser light, and distinguishing between illumination of photodetectors by such a moving, relatively thin beam of laser light, and illumination of photodetectors by an omnidirectional pulse of light, comprising the steps of:

positioning a plurality of photodetector arrays in a generally vertical row, each array including a plurality of photodetector elements arranged in a generally vertical array row, such that the photodetector elements in said arrays are collectively arranged in a generally vertically oriented, extended row, each of said photodetector elements providing an electrical output when illuminated, for each array, providing a portion of the electrical output of each photodetector element in the array as a first reference signal related to the spacing of the photodetector element from a first end of the array row, and providing a portion of the electrical output of each photodetector element in the array as a second reference signal related to the spacing of the photodetector element from the second end of said array row, determining the sum of the first and second reference signals from said photodetector arrays, determining the difference between the largest of the first and second reference signals from said photodetector arrays and the smallest of the first and second reference signals from said photodetector arrays, dividing said sum of the first and second reference signals from said photodetector arrays by said difference between the largest of the first and second reference signals from said photodetector arrays and the smallest of the first and second reference signals from said photodetector arrays, thereby providing a quotient, and interpreting the quotient as indicating illumination of said photodetectors by a moving, relatively thin beam of laser light when said quotient is less than a predetermined level, and interpreting the quotient as indicating illumination of said photodetectors by an omnidirectional pulse of light when said quotient is greater than said predetermined level.

2. The method according to claim 1, further comprising the step of displaying an indication of said position of said reference light with respect to said row.

3. The method according to claim 1, in which the step of positioning a plurality of photodetector arrays in a generally vertically oriented row comprises the step of evenly spacing said plurality of photodetector arrays along said generally vertically oriented row, and evenly spacing said plurality of photodetector elements within each array.

4. The method according to claim 1, in which there are four reference signals, and in which the predetermined level used for interpretation of the quotient is approximately 2.5.

5. A method for distinguishing between illumination of photodetectors by a moving, relatively thin beam of laser light, and illumination of photodetectors by an omnidirectional pulse of light, comprising the steps of:

positioning a plurality of photodetector elements, said elements being connected into a plurality of arrays and each photodetector element providing an electrical output when illuminated, for each array providing a first reference signal, and a second reference signal, the difference between the reference signals indicating the position of photodetector elements in the array being illuminated, and determining whether at least some of said reference signals are below a reference level and interpreting the situation, where fewer than a predetermined number of said reference signals are below said reference level as an indication of illumination of photodetectors by an omnidirectional pulse of light.

6. The method of claim 5 for distinguishing between illumination of photodetectors by a moving, relatively thin beam of laser light, and illumination of photodetectors by an omnidirectional pulse of light, further comprising the step of assessing the distribution of the light energy received by said photodetectors by comparing the level of energy received by all of the photodetectors with the variation among the photodetectors in the levels of energy received, whereby wide variation in the level of energy as compared to the level of energy received by all of the photodetectors suggests illumination by a relatively thin beam of laser light, and narrow variation in the level of energy as compared to the level of energy received by all of the photodetectors suggests illumination by an omnidirectional pulse of light.

7. The method of claim 6 for distinguishing between illumination of photodetectors by a moving, relatively thin beam of laser light, and illumination of photodetectors by an omnidirectional pulse of light in which said omnidirectional pulse of light comprises a strobe light pulse.

8. A method for distinguishing between illumination of photodetectors by a moving, relatively thin beam of laser light, and illumination of photodetectors by an omnidirectional pulse of light, comprising the steps of:

positioning a plurality of photodetector elements, said elements being connected into a plurality of arrays and each photodetector element providing an electrical output when illuminated, for each array providing a first reference signal, and a second reference signal, the difference between the reference signals indicating the position of photodetector elements in the array being illuminated, and assessing the distribution of the light energy received by said photodetectors by comparing the level of energy received by all of the photodetectors with the variation among the photodetectors in the levels of energy received, whereby wide variation suggests illumination by a relatively thin beam of laser light and narrow variation suggests illumination by an omnidirectional pulse of light.

9. The method according to claim 8 for distinguishing between illumination of photodetectors by a moving, relatively thin beam of laser light, and illumination of photodetectors by an omnidirectional pulse of light includes the step of determining whether at least some of said reference signals are below a reference level and interpreting the situation where fewer than a predetermined number of said reference signals are below said reference level as an indication of illumination of photodetectors by an omnidirectional pulse of light.

10. The method according to claim 8 for distinguishing between illumination of photodetectors by a moving, relatively thin beam of laser light, and illumination of photodetectors by an omnidirectional pulse of light in which said omnidirectional pulse of light comprises a strobe light pulse.

11. A device for detecting a moving, relatively thin beam of laser light, and distinguishing between illumination of photodetectors by such a moving, relatively thin beam of laser light, and illumination of photodetectors by an omnidirectional pulse of light, comprising:

a plurality of photodetector arrays arranged in a generally vertical row, each array including a plurality of photodetector elements arranged in a generally vertical array row, such that the photodetector elements in said arrays are arranged in a generally vertically oriented, extended row, each of said photodetector elements providing an electrical output when illuminated, a plurality of circuits, each such circuit associated with a respective one of said plurality of photodetector arrays, each circuit providing a portion of the electrical output of each photodetector element in the associated array as a first reference signal related to the spacing of the photodetector element from a first end of said array row, and providing a portion of the electrical output of each photodetector element in the associated array as a second reference signal related to the spacing of the photodetector element from the second end of said array row, the weighting circuit associated with each array row being connected to the weighting circuits associated with adjacent array rows, circuitry, associated with and responsive to the reference signals from connected weighting circuits, for assessing the distribution of the light energy received by said photodetectors by comparing the level of energy received by all of the photodetectors with the variation among the photodetectors in the levels of energy received, whereby wide variation suggests illumination by a relatively thin beam of laser light and narrow variation suggests illumination by an omnidirectional pulse of light.

12. A device according to claim 11 for detecting a moving, relatively thin beam of laser light, and distinguishing between illumination of photodetectors by such a moving, relatively thin beam of laser light, and illumination of photodetectors by an omnidirectional pulse of light, in which said circuitry assesses the distribution of the light energy received by said photodetectors by determining whether some photodetectors received a significantly reduced level of light.

13. A device according to claim 11 for detecting a moving, relatively thin beam of laser light, and distinguishing between illumination of photodetectors by such a moving, relatively thin beam of laser light, and illumination of photodetectors by an omnidirectional pulse of light in which said photodetector elements comprise PIN diodes.

14. A device according to claim 11 for detecting a moving, relatively thin beam of laser light, and distinguishing between illumination of photodetectors by such a moving, relatively thin beam of laser light, and illumination of photodetectors by an omnidirectional pulse of light, in which said the first and second reference signals of the array illuminated by a thin beam of laser light provide an indication of the photodetector or photodetectors illuminated by the beam.

* * * * *